United States Patent [19]

Komurasaki

[11] Patent Number: 4,982,599
[45] Date of Patent: Jan. 8, 1991

[54] ACCELERATION DETECTOR

[75] Inventor: Satoshi Komurasaki, Himeji, Japan

[73] Assignee: Mitsubishi Denki Kabushiki Kaisha, Tokyo, Japan

[21] Appl. No.: 316,824

[22] Filed: Feb. 28, 1989

[30] Foreign Application Priority Data

Feb. 29, 1988 [JP] Japan ............................ 63-25182[U]

[51] Int. Cl.$^5$ ........................ G01L 23/22; G01P 15/09
[52] U.S. Cl. ............................................ 73/35; 310/329
[58] Field of Search ................... 73/35, 654; 310/329

[56] References Cited

U.S. PATENT DOCUMENTS

| 3,339,090 | 8/1967 | Jaffe et al. ............................ 310/329 |
| 4,030,396 | 6/1977 | Mariner ................................ 310/329 |
| 4,336,707 | 6/1982 | Yamaguchi et al. .................... 73/35 |
| 4,660,409 | 4/1987 | Miyata et al. ......................... 73/35 |
| 4,713,573 | 12/1987 | Gansert et al. ....................... 310/329 |

FOREIGN PATENT DOCUMENTS 23730 7/1985 Japan .

Primary Examiner—John Chapman
Attorney, Agent, or Firm—Sughrue, Mion, Zinn, Macpeak and Seas

[57] ABSTRACT

An acceleration detector comprising an acceleration transducer assembly disposed in a housing and including a piezoelectric element and an inertial weight. A relatively soft resilient filler material is applied around the acceleration transducer assembly for resiliently supporting the acceleration transducer assembly relative to the housing so that the inertial weight can move relative to the piezoelectric element when an acceleration is applied to the inertial weight. A relatively hard sealing material is applied on the resilient filler material for sealing and covering the relatively soft resilient filler material against the environment. The resilient filler material and the sealing material may be thermosetting resin.

7 Claims, 2 Drawing Sheets

FIG. I
PRIOR ART
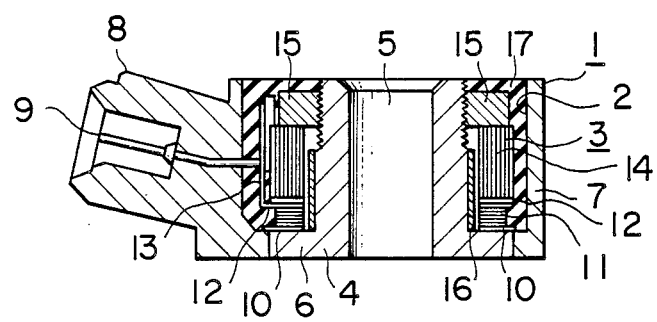
FIG. 2
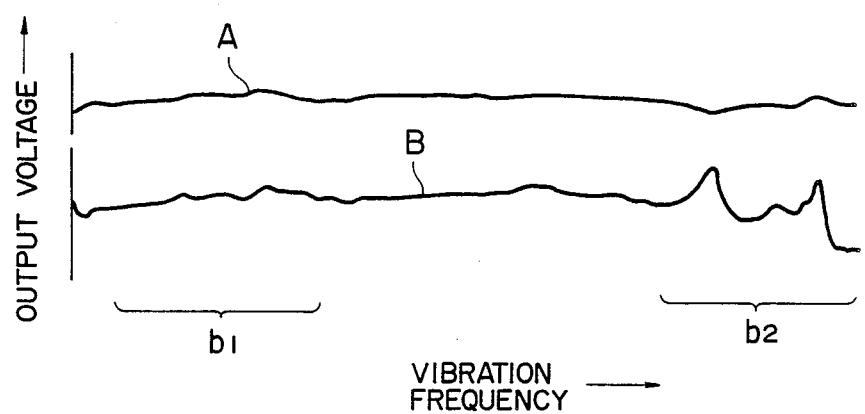

ACCELERATION DETECTOR

BACKGROUND OF THE INVENTION

This invention relates to an acceleration detector and more particularly to an acceleration detector for detecting knocking in an internal combustion engine.

FIG. 1 illustrates one example of an acceleration detector to which the present invention can be applied. This acceleration detector is attached to an internal combustion engine for detecting vibration or knocking of the engine. The acceleration detector comprises a housing 1 defining an annular cavity 2 therein and an acceleration transducer assembly 3 disposed within the cavity 2.

The housing 1 comprises a tubular bushing 4 having a through hole 5 and a flange 6. The housing 1 also comprises a ring-shaped outer case 7 connected to the flange 6 of the bushing 4 so that the cavity 2 is defined therein. The outer case 7 also has a connector 8 radially outwardly extending from the outer case 7 so that an output terminal 9 can extend through the connector 8 for taking out an output signal from the acceleration transducer assembly 3 disposed within the cavity 2. The acceleration transducer assembly 3 includes a washer-shaped plate 10 placed on the flange 6 of the bushing 4, an annular piezoelectric element 11 placed on the washer plate 10, a washer-shaped terminal 12 including a lead 13 connected to the output terminal 9, an annular inertial weight 14 placed on the washer terminal 12 and a threaded ring-shaped stop nut 15 thread engaged with the thread on the tubular bushing 4. An electrically insulating tube 16 is placed on the tubular bushing 4 so that the acceleration transducer assembly 3 is insulated from the bushing 4.

In order to resiliently support and protect the acceleration transducer assembly 3 within the cavity 2 from undesirable environmental conditions, the remaining space of the cavity 2 of the housing 1 which is not occupied by the acceleration transducer assembly 3 is substantially filled with a resilient filler material 17 of a thermo-setting resin. The filler material 17 must be sufficiently resilient after it is cured to allow the movement of the inertial weight 14 relative to the housing 1 when an acceleration is applied to the inertial weight 14 so that the piezoelectric element 11 generates a voltage signal proportional to the pressure exerted on it by the relative movement of the inertial weight 14 against the piezoelectric element 11.

When in use, the acceleration detector is securely mounted on an internal combustion engine (not shown) by a bolt (not shown) inserted into the central through hole 5. the acceleration or the vibration of the internal combustion engine produces the movement of the inertial weight 14 relative to the housing 1, which causes the piezoelectric element 11 to be stressed by the inertial weight 14, whereby an electrical signal indicative of the movement of the inertial weight 14 relative to the engine is generated from the piezoelectric element 11. The electrical signal is provided through the washer terminal 12, the lead 13 and the output terminal 9 to be analyzed to determine as to whether or not a knocking signal which generates upon knocking of the internal combustion engine is involved. When it is determined that a knocking signal is contained in the electrical signal, the operating parameters for operating the engine can be adjusted to increase the output power or decrease the fuel consumption rate.

In the acceleration detector of the above construction, the acceleration transducer assembly 3 is resiliently supported within the cavity 2 by the resilient filler material 17, which is a thermo-cured mixture of a main agent and a curing agent. When the filler material 17 thus cured is soft or sufficiently resilient for allowing the movement of the inertial weight 14 relative to the housing 1 when an acceleration is applied to the inertial weight 14, the acceleration detector exhibits good acceleration detecting characteristics. However, when this detector is exposed to an elevated temperature, the filler material 17 is further hardened to deteriorate the acceleration detecting characteristics. Also, the resilient filler material 17 easily becomes brittle when contacted by gasoline and its resistance to liquid degradation is poor.

When the filler material 17 is made less resilient or sufficiently hard so that a good resistance to environment and a good liquid resistivity are obtained, the acceleration detecting characteristics often become undesirable because of impeded relative movement of the inertial weight. FIG. 2 shows graphs of the detecting characteristics of the related acceleration detector of a general structure as shown in FIG. 1 with and without the cavity 2 filled with the filler material 17. The detection characteristic of the detector when the cavity 2 is not filled with the filler material 17 is shown by a curve A of FIG. 2 from which it is seen that its frequency characteristic is generally smooth and flat. When the cavity 2 is filled with the resilient filler material 17 as shown in FIG. 1, the detection characteristic of the detector has frequency characteristic as shown by an irregular curve B of FIG. 2, from which it is seen that the detection characteristic is disturbed at a lower a frequency band $b_1$ and is significantly disturbed at a higher frequency region $b_2$.

Thus, it is highly desirable to obtain an acceleration detector which has flat frequency characteristics and which is yet resistive against the environment.

SUMMARY OF THE INVENTION

Accordingly, one object of the present invention is to provide an acceleration detector which has flat frequency characteristics and which is yet resistive against the environment.

Another abject of the present invention is to provide an acceleration detector whose acceleration transducer assembly is resiliently supported and yet sealed against the environment.

Another object of the present invention is to provide an acceleration detector which is accurate and durable.

Further object of the present invention is to provide an acceleration detector with a simple structure.

With the above objects in view, the acceleration detector of the present invention comprises an acceleration transducer assembly disposed in a housing and including a piezoelectric element and an inertial weight. A relatively soft resilient filler material is applied around the acceleration transducer assembly for resiliently supporting the acceleration transducer assembly relative to the housing so that the inertial weight can move relative to the piezoelectric element when an acceleration is applied to the inertial weight. A relatively hard sealing material is applied on the resilient filler material for sealing and covering the relatively soft resilient filler material against the environment. The resilient filler material and the sealing material may be thermosetting resin.

BRIEF DESCRIPTION OF THE DRAWINGS

The present invention will become more readily apparent from the following detailed description of the preferred embodiments of the present invention taken in conjunction with the accompanying drawings, in which:

FIG. 1 is a vertical sectional view showing one example of an acceleration detector to which the present invention is applicable;

FIG. 2 is a graph showing the frequency characteristics of the acceleration detector similar to that shown in FIG. 1 with and without the filler material;

DESCRIPTION OF THE PREFERRED EMBODIMENTS

Figure 3:
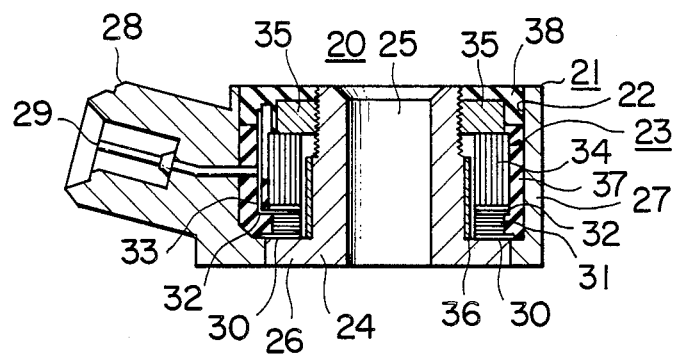
FIG. 3 is a vertical sectional view showing one embodiment of the acceleration detector of the present invention.

FIG. 3 illustrates an acceleration detector 20 of the present invention which can also be attached to an internal combustion engine for detecting vibration or knocking of the engine. The acceleration detector 20 comprises a ring-shaped housing 21 defining an annular cavity 22 therein and an annular acceleration transducer assembly 23 disposed within the cavity 22.

The housing 21 comprises a tubular bushing 24 having a through hole 25 and a flange 26. The housing 21 also comprises a ring-shaped outer case 27 connected to the flange 26 of the bushing 24 so that the cavity 22 is defined therein. The outer case 27 also has a connector 28 radially outwardly extending from the outer case 27 so that an output terminal 29 can extend through the connector 28 for taking out an output signal from the acceleration transducer assembly 23 disposed within the cavity 22. The acceleration transducer assembly 23 includes a washer-shaped plate 30 placed on the flange 26 of the bushing 24, an annular piezoelectric element 31 placed on the washer plate 30, a washer-shaped terminal 32 including a lead 33 connected to the output terminal 29, an annular inertial weight 34 placed on the washer terminal 32 and a threaded ring-shaped stop nut 35 thread engaged with the thread on the tubular bushing 24. An electrically insulating tube 36 is placed on the tubular bushing 24 so that the acceleration transducer assembly 23 is insulated from the bushing 24.

In order to resiliently support and protect the acceleration transducer assembly 23 within the cavity 22 from undesirable environmental conditions, a resilient filler material 37 of a thermo-setting resin material is applied around the inertial weight 34 so that the inertial weight 34 is substantially surrounded. In the illustrated embodiment, it is seen that the resilient filler material 37 substantially fills the cavity 22 defined within the housing 21 from the bottom to a level slightly above the top of the inertial weight 34. The resilient filler material 37 must be sufficiently resilient after it is cured to allow the movement of the inertial weight 34 relative to the housing 21 when an acceleration is applied to the inertial weight 34 so that the piezoelectric element 31 disposed between the inertial weight 34 and the housing 21 generates a voltage signal proportional to the pressure exerted on it by the relative movement of the inertial weight 34 against the piezoelectric element 21.

The remaining space of the cavity 22 of the housing 21 above the resilient filler material 37 is substantially filled with a sealing material 38 of a thermo-setting resin less resilient than the resilient filler material 37. The sealing material 38 is in inimate contact with the inner surface of the housing 21, the stop nut 35 and the top surface of the resilient filler material 37 to firmly close the opening of the cavity 22 to seal the acceleration transducer assembly 23 within the cavity 22.

The resilient filler material 37 and the sealing material 38 may be thermo-setting resin mixtures of the same main agent material and the curing agent material with different proportions. Alternatively, they may be thermo-setting resinous mixtures of the same main agent and different curing agents.

A preferable resilient filler material 37 is an epoxy resin mixture of a main agent XN1019N and a curing agent XN1124 both manufactured and sold from Nagase Chiba Kabushiki Kaisha, Japan. The filler material 37 has a durometer hardness of the order of from A10 to A30 when cured. Another material for the resilient filler material 37 may be a silicone gel material used as a filler in IC ignitors containing a hybrid IC.

A preferable sealing material 38 is an epoxy resin mixture of a main agent XN1019N and a curing agent XN1213 both manufactured and sold from Nagase Chiba Kabushiki Kaisha. This sealing material 38 has a durometer hardness of the order of from A40 to A60 when cured. Alternatively, a main agent XN1135N and a curing agent XN1089 also available from Nagase Chiba Kabushiki Kaisha may be mixed and heated to be cured to exhibit a durometer hardness of the order of from A40 to A70. Many other sealing material can be used as far as the durometer hardness is equal to or more than A40.

When in use, the acceleration detector is securely mounted on an internal combustion engine (not shown) by a bolt (not shown) inserted into the central through hole 25. The acceleration or the vibration of the internal combustion engine produces the movement of the inertial weight 34 relative to the housing 21, which causes the piezoelectric element 31 to be stressed by the inertial weight 34, whereby an electrical signal indicative of the movement of the inertial weight 34 relative to the engine is generated from the piezoelectric element 31. The electrical signal is provided through the washer terminal 32, the lead 33 and the output terminal 29 to be analyzed to determine as to whether or not a knocking signal which generates upon knocking of the internal combustion engine is involved. When it is determined that a knocking signal is contained in the electrical signal, the operating parameters for operating the engine can be adjusted to increase the output power or decrease the fuel consumption rate.

In the acceleration detector of the present invention, the acceleration transducer assembly 23 is resiliently supported within the cavity 22 by the resilient filler material 37, which is a thermo-cured mixture of a main agent and a curing agent. Since the resilient filler material 37 thus cured is soft or sufficiently resilient for allowing the movement of the inertial weight 34 relative to the housing 11 when an acceleration is applied to the inertial weight 34, the acceleration detector is ensured to exhibit good acceleration detecting characteristics. For example, a substantially flat frequency characteristic can be obtained over a wide range of 1 kHz to 20 kHz. Also, since the sealing material 38 is less resilient and effective to seal the acceleration transducer assembly 23 and the resilient material 38 against the undesirable environment, the reliability and a long operating lifetime of the acceleration detector is ensured. Therefore, the filler material 37 is not hardened to deteriorate the acceleration detecting characteristics, and the resilient filler material 37 does not easily become brittle by the contact to gasoline and is superior in liquid resistance.

Figure 4:
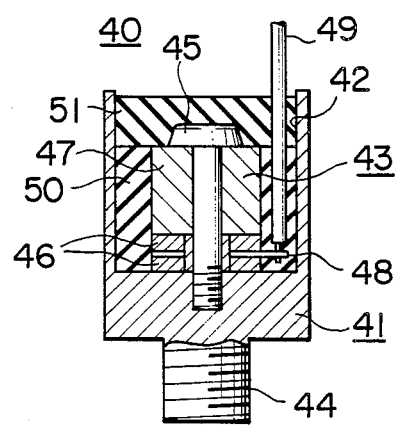
FIG. 4 is a vertical sectional view showing another embodiment of the acceleration detector.

FIG. 4 illustrates another acceleration detector 40 of the present invention in which the acceleration detector disclosed in Japanese Utility Model Laid-Open No. 60-23730 is modified according to the present invention. The acceleration detector 40 comprises a housing 41 defining a cavity 42 therein and an acceleration transducer assembly 43 disposed within the cavity 42. The housing 41 has a mounting bolt 44 which can be thread-engaged with an internal combustion engine (not shown) and a bolt 45 thread-engaging into the bottom wall of the housing 41. Around this bolt 45 and between the head of the bolt 45 and the bottom wall of the housing 41, an acceleration transducer assembly 43 is mounted. The acceleration transducer assembly 43 includes an annular piezoelectric element 46 placed on the bottom of the cavity 42, an annular inertial weight 47 placed between the piezoelectric element 46 and the bolt head, and an output terminal 48 extending through the piezoelectric element 46. One end of an output lead 49 is connected to the output terminal 48 and the other end of the output lead 49 extends through the cavity 42 to the exterior of the housing 41.

The acceleration detector 40 further comprises a resilient filler material 50 applied around the acceleration transducer assembly 43 within the cavity 42 for resiliently supporting the acceleration transducer assembly 43 relative to the housing 41. The resilient filler material 50 may be the same filler material as those explained in conjunction with the previous embodiment shown in FIG. 3 and must be sufficiently resilient to allow the movement of the inertial weight 47 relative to the housing 41 when an acceleration is applied to the inertial weight 47. The resilient material 50 is filled up to the level of the top end surface of the inertial weight 47.

The cavity 42 above the resilient material 50 is filled with a sealing material 51 for sealing and covering the resilient filler material 50. The sealing material may be the same material as those explained in conjunction with the previous embodiment shown in FIG. 3. In this embodiment also, the resilient filler material 50 and the less resilient sealing material 51 serve in the same way as those described in conjunction with the embodiment shown in FIG. 3.

As has been described, a relatively soft resilient filler material is applied around an acceleration transducer transducer assembly relative to a detector housing so that an inertial weight of the assembly can move relative to a piezoelectric element when an acceleration is applied, and a relatively hard sealing material is applied on the resilient filler material for sealing and covering the relatively soft resilient filler material against the environment. Therefore, the acceleration detector has flat frequency characteristics and is yet resistive against the environment, so that the acceleration detector is accurate and durable. Moreover, the structure is simple and easy to manufacture.

What is claimed is:

1. An acceleration detector for an internal combustion engine, comprising:
 a generally cylindrical housing including a base portion and an outer wall upstanding therefrom to define an annular, open ended cavity therein, said base portion including means for mounting the housing to an internal combustion engine;
 an acceleration transducer assembly disposed in said cavity and including an annular piezoelectric element and an annular inertial weight arranged in an axial stack with the piezoelectric element adjacent said base portion;
 a resilient filler material applied around said acceleration transducer assembly for resiliently supporting said acceleration transducer assembly relative to said housing, said resilient filler material being sufficiently resilient to allow the movement of said inertial weight relative to said housing when an acceleration is applied to said inertial weight, and filling said cavity to a level proximate an upper end of the inertial weight; and
 a relatively hard, substantially non-resilient sealing material applied on and overlying said resilient filler material for sealing and covering said resilient filler material, said sealing material filling a remaining space within said cavity up to said open end thereof.

2. An acceleration detector as claimed in claim 1, wherein said resilient filler material and said sealing material are thermosetting resin materials of different hardness.

3. An acceleration detector as claimed in claim 2, wherein said resilient filler material and said sealing material have the same main agent and different setting agents.

4. An acceleration detector as claimed in claim 1, wherein said resilient filler material is a silicone gel filler material.

5. An acceleration detector as claimed in claim 2, wherein said resilient filler material has a durometer hardness of from A10 to A30 and said sealing material has a durometer hardness of more than A40.

6. An acceleration detector as claimed in claim 5, wherein said sealing material has a durometer hardness of from A40 to A70.

7. An acceleration detector as claimed in claim 6, wherein said sealing material has a durometer hardness of from A40 to A60.

* * * * *